March 28, 1944. E. F. ABER 2,344,953
METHOD OF MANUFACTURING TOOTHED ELEMENTS
Filed May 3, 1940 2 Sheets-Sheet 1
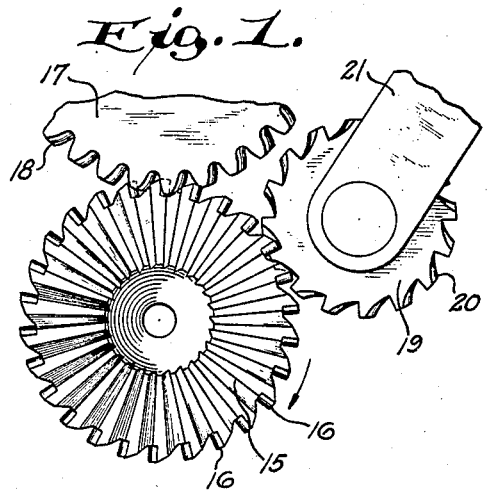
Fig. 1.
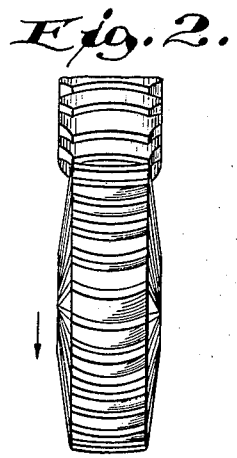
Fig. 2.
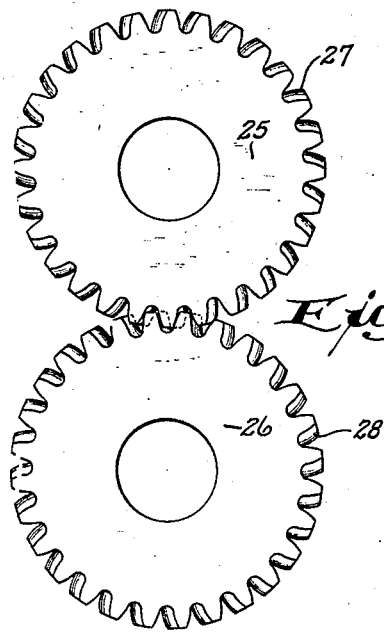
Fig. 3.
Fig. 6.
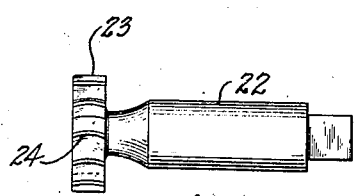
Fig. 5.
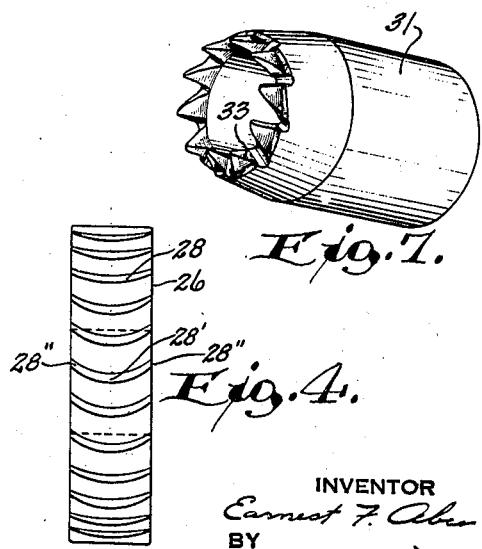
Fig. 7.
Fig. 4.
INVENTOR
Earnest F. Aber
BY
Morsell Kiebee Morsell
ATTORNEYS March 28, 1944.  E. F. ABER  2,344,953
METHOD OF MANUFACTURING TOOTHED ELEMENTS
Filed May 3, 1940   2 Sheets-Sheet 2
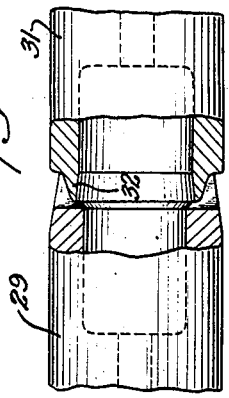
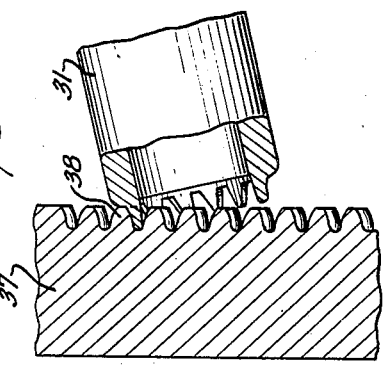
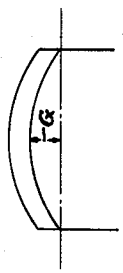
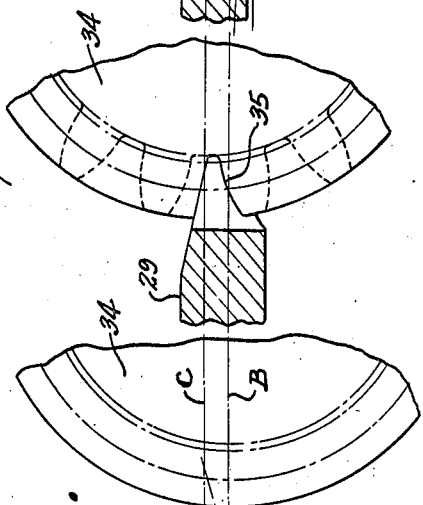
INVENTOR
Earnest F. Aber
BY
ATTORNEYS.

Patented Mar. 28, 1944

2,344,953

UNITED STATES PATENT OFFICE 2,344,953

METHOD OF MANUFACTURING TOOTHED ELEMENTS

Earnest F. Aber, Racine, Wis.

Application May 3, 1940, Serial No. 333,067

9 Claims. (Cl. 90—9.6)

This invention relates to improvements in a method of manufacturing a toothed element and is a continuation in part of application Serial No. 311,877 filed December 30, 1939, Patent No. 2,322,408, June 22, 1943.

Heretofore the majority of gears have been of the spur tooth type having teeth which are cut straight across the periphery of the blank in a direction parallel to the axis. Because of the straight teeth, spur gears are relatively inexpensive to manufacture and are in extensive use. In using this type of spur gear, however, problems are frequently encountered in connection with lateral play which result in excessive vibration and noise, and in many instances make it necessary to employ expensive thrust bearings. It has heretofore been attempted to overcome some of the objections of straight tooth spur gears by the use of teeth of more complicated form such as are found in the herringbone type of gear. This gear, while satisfactory for many uses, is, however, so expensive as to make it impractical for common use.

It is one of the objects of the present invention to provide a toothed element in which the teeth are of novel form whereby the teeth have greater length in a direction parallel to the axis of the gear than a straight tooth would have on a gear of the same thickness with the result that there is a greater length of contact between meshing teeth during operation; whereby there are more teeth in contact at one time than when the usual type of spur gear is employed; whereby greater strength is obtained; whereby quieter operation results; whereby there is a smooth flow of power from one gear to another during operation; and whereby the necessity of employing expensive thrust bearings is eliminated.

A further object of the invention is to provide a toothed element which may be utilized as a rotary cutter with the advantages of obtaining a shear type of cut, of discharging chips before the latter can plug up the recesses between the teeth, and of having a greater number of teeth in contact with the work during cutting, said advantages being in addition to those advantages which are obtained when the toothed element is used for driving purposes only.

A more specific object of the invention is to provide a toothed element which has teeth which are curved in plan view whereby the above advantages may be obtained.

A still further object of the invention is to provide an improved manufacturing method which makes it practical to produce, at relatively low cost, a toothed element having teeth which are curved in plan view. With ordinary methods of cutting teeth in gears it would be considered impossible to produce such teeth because a milling cutter cannot be fed transversely across the periphery of the gear, when cutting a curved tooth, whereas the straight teeth on an ordinary spur gear can be readily cut by this method.

A still further object of the invention is to provide an improved method whereby curved teeth can be milled in a single blank with a single milling operation for each side of a tooth, whereas with a herringbone type of gear either two spiral gears must be juxtaposed or each side of a tooth must be milled from both sides of the blank requiring two operations for each side of a tooth.

A further object of the invention is to provide a method of manufacturing curved tooth gears comprising utilizing the inside of one hollow mill to cut the convex side of a tooth and utilizing the outside of another hollow mill to cut the concave side of a tooth, the outside radius of said last hollow mill being equal to the inside radius of the first hollow mill.

A further object of the invention is to provide a method of manufacturing curved tooth gears as before described wherein perfect conformity between the two hollow mills is obtained by utilizing the larger hollow mill to cut the outer cutting edge portion of the smaller hollow mill.

A further object of the invention is to provide a method of cutting curved teeth on the periphery of a circular blank with a hollow mill wherein there is no material variation, such as might affect the operation of the gears, in the pressure angle of a tooth at different points in the curve of said tooth.

With the above and other objects in view the invention consists of the improved toothed element and method of manufacturing the same and all parts and combinations and all equivalents thereof.

In the accompanying drawings in which the same reference numerals designate the same parts in all of the views:

Fig. 1 is a face view of a cherrying attachment cutter embodying the principles of the present invention, part of the driving pinion for said cutter being illustrated and there also being an idler pinion in mesh with the cutter;

Fig. 2 is a front view of the cutter and part of the driving pinion shown in Fig. 1;

Fig. 3 is a view illustrating a pair of gears constructed in accordance with the teachings of the present invention;

Fig. 4 is a view looking at the periphery of one of said gears;

Fig. 5 is a side view of a Woodruff keyway cutter wherein the circular cutting portion has curved peripheral teeth constructed in accordance with the present invention;

Fig. 6 is a perspective view of the hollow mill which is employed to cut the convex side of the teeth in a gear blank;

Fig. 7 is a perspective view of the hollow mill used for cutting the concave side of the teeth;

Fig. 8 is a partially diagrammatic view showing a fragment of a gear blank mounted in operative relationship with respect to the hollow mill cutter for cutting the convex side of the teeth, only the uppermost tooth of the hollow mill being illustrated.

Fig. 9 is a similar view showing the convex side of a tooth being cut;

Fig. 10 is a similar view showing the concave side of a tooth being cut;

Fig. 11 is a view of a fragment of the gear blank after a plurality of teeth have been cut, the blank being shown in section midway of the thickness of the blank;

Fig. 12 is a side view partially in section illustrating how the hollow mill for cutting the convex side of a tooth is used in forming the hollow mill for cutting the concave side of a tooth;

Fig. 13 is a fragmentary longitudinal sectional view midway of the thickness of a rack illustrating how the improved method may be used in cutting curved teeth in a rack bar.

Fig. 14 is a plan view partially diagrammatic of one of the teeth of a cut gear.

Referring more particularly to the drawings the invention comprises in general a circular element having teeth which are cut on an arc or radius and which are therefore curved in plan view. Fig. 1 illustrates a cutting wheel 15 having a plurality of curved teeth 16 said cutting wheel being driven by a pinion 17 which has teeth 18 which are curved in conformity to the curvature of the teeth of the cutting wheel 15. This type of cutting wheel is very useful in cherrying and may be employed in connection with a cherrying attachment for milling machines of the type illustrated in co-pending application Serial No. 311,877 filed December 30, 1939. An idler pinion 19 which has teeth 20 which are cut on an arc to conform to the shape of the teeth 16 of the cutting wheel 15 is rotatably supported by a forked or other suitable member 21. It is obvious that when the cutting wheel is rotated in the direction of the arrows in Figs. 1 and 2 that a shear type of cut will be made due to the curve of the teeth. It is also obvious that due to the curve at the ends of the teeth that chips will be discharged before the latter can plug up the recesses between the teeth. Furthermore due to the curve of the teeth there are a greater number of teeth in contact with the work at one time than if a straight tooth cutter were employed. The curved teeth also provide for a greater length of contact with the work and are also stronger due to the fact that the cutting wheel is driven by a pinion having teeth which are similarly curved and lateral play of the cutter during use is prevented and much smoother and quieter operation results.

The same principles may also be employed in a Woodruff keyway cutter 22 (see Fig. 5) wherein the cutting wheel 23 has curved teeth 24.

In Fig. 3 a pair of gears 25 and 26 is illustrated said gears having curved teeth 27 and 28 respectively. Such gears may be adapted for a wide variety of uses and due to the curved teeth eliminate the necessity, in many cases, of employing expensive thrust bearing. In addition to having many of the advantages in common with the curved tooth cutter, as set forth above the curved tooth gear results in a smooth flow of power from one gear to the other. The teeth are of slightly greater thickness at the center 28' (Fig. 4) than at the ends 28" measuring along a radius line, and therefore, there is greater strength at the center where such strength is most necessary.

Heretofore the cutting of curved teeth in gear blanks has been considered impossible. It is not practical to mill transversely across the periphery of the gear to form a curved tooth as is done in cutting the straight teeth of a spur gear and other ordinary methods of milling fail to produce the uniformity and perfection of curve which is necessary if an operable and smooth running gear is desired.

According to the present invention a hollow mill type of cutter 29, as illustrated in Fig. 6, is formed having teeth provided with cutting edges 30. These cutting edges are of the proper contour to produce one side of an involute tooth on a blank for a gear or the like. After completion of the hollow mill shown in Fig. 6 a blank for another hollow mill 31 is taken, as shown in Fig. 12, and fed into the completed hollow mill 29 while the latter is being rotated. Thus the inner cutting edges 30 of the cutter 29 are utilized to form the outer contour of the cutting tooth portion of the blank 31. After the operation illustrated in Fig. 12 is completed the hollow mills are separated and individual teeth are milled into the stock 32 of the blank 31, said individual teeth ultimately having cutting edges 33 as illustrated in Fig. 7. With this method of procedure perfect conformity in contour is obtained in the two hollow mill cutters and conformity in the contours on the two sides of a curved tooth to be cut in a gear blank by the use of the hollow mills 29 and 31. The cutting edges 30 of the hollow mill 29 are adapted to cut the convex side of a curved tooth on a gear blank and the cutting edges 33 on the hollow mill 31 are adapted to cut the concave side of a curved tooth on a gear or the like.

In using these hollow mill cutters, due to the curve of the teeth which are to be cut and due to the curvature of the periphery of the blank, if the pressure angle of the cutter teeth were the same as the pressure angle desired on the tooth of the gear being made there might be difficulties encountered because the pressure angle would become substantially less on the outer ends of the curves of the gear teeth than it would be at the center of said curves with the result that the gear would not be free working and that it would be noisy.

One method of overcoming this trouble is as follows, assuming that a 28 tooth 12 pitch gear is to be cut wherein a 14½° pressure angle is desired:

Instead of having the pressure angle on the teeth on the hollow mill cutter 14½°, this pressure angle should be substantially greater, such as approximately 17½°, as indicated by angle A in Fig. 8. Referring to said figure the gear blank 34 is supported in a fixture constructed to permit raising and lowering of the gear blank and also rotation thereof, there being indexing mechanism for holding the gear blank in a desired position of rotation. A center line B is preferably marked into the gear blank and positioned in a position substantially horizontal. The cutter 29 is supported in a horizontal position and is connected with mechanism whereby it may be rotated. First the top of the circular pitch line of the cutter teeth is lined up with the center line B of the gear blank as shown in Fig. 8, wherein only the uppermost tooth of the hollow mill is illustrated. Next, for the 28 tooth 12 pitch gear above specified, the gear supporting fixture is raised approximately .110 of an inch to bring the center line of the gear blank from the position B to the position C.

The hollow mill cutter is then rotated and fed inwardly as illustrated in Fig. 9 to cut the convex side 35 of one of the teeth with a pressure angle of approximately 17½° because of the fact that this is the pressure angle on the teeth of the cutter. Next the hollow mill cutter is withdrawn and the cutter 29 is replaced by the cutter 31, the latter, however, being supported on an axis which is identically positioned as before. Then the gear blank supporting table is moved twice the distance downwardly as it was moved upwardly before to bring the center line of the gear blank into a position D below the line B of Fig. 8 a distance approximately equal to the distance that the line C is above the line B. Following this change in the elevation of the gear table the gear is rotated with the indexing mechanism about 4½°, causing the previous center line to be angled slightly away from horizontal position D, as shown at E. Then the second hollow mill is rotated and fed into the work, as indicated in Fig. 10, to cut the concave side 36. Due to the movement of the gear supporting fixture or table above and below the original position B and due to the indexing prior to cutting the concave side of the tooth the result is the cutting of teeth having a 14½° pressure angle on each side of the center line E, and because of this method of procedure there is no material variation in the pressure angle at the ends of the curves of the teeth such as there would be if the pressure angle on the teeth of the hollow mill cutters were the same as the pressure angle desired for the teeth of the gear being cut.

The remaining teeth on the blank may then be cut following the same procedure or all of the convex sides may be cut without changing the hollow mill and then all of the concave sides may be cut.

The method of determining the amount which the gear blank table is raised and lowered and the number of degrees that the gear blank is rotatably indexed is as follows, using a 28 tooth 12 pitch gear for illustration:

Referring first to Fig. 11, the tooth thickness on the circular pitch line indicated by the line F in Fig. 11 on a 12 pitch gear is .130 of an inch, and in order to determine the distance which the gear table must be raised from the line B to the line C in Fig. 8 it is necessary to first take one-half of .130, or .065 of an inch, and add to this one-half of the distance G (see Fig. 14), which is the distance between the center of the curve of a tooth and the center line of the pitch line of the tooth. On a 12 pitch gear this distance G is .090 and half of this distance is .045 of an inch. Adding .045 and .065 gives a total of .110, which is the distance which the gear blank was raised from line B to line C in Fig. 8.

Then to determine the amount which the gear table must be lowered before cutting with the hollow mill 31 as in Fig. 9 it is necessary to double .110 of an inch, giving a distance of .220 of an inch, which the gear table is lowered from line C before utilizing the second hollow mill. The difference between this table movement of .220 and the thickness F of a tooth, which is .130, is .090 of an inch and the gear blank must be rotatably indexed to compensate for this difference. Inasmuch as one degree is equal to .020 of an inch on a 12 pitch gear, dividing .090 of an inch (the difference between the movement of the table and the thickness of the tooth) by .020, gives 4½°, which is the amount of rotatable indexing required before cutting with the hollow mill 31.

While the mathematical figures in connection with the above described method are those which are preferably employed to produce the 28 tooth gear shown in Fig. 3, Figs. 8 to 11, inclusive, because of their large scale, do not actually show a 28 tooth gear.

The completed gear will have all of its teeth cut in the manner shown in Fig. 11, which is a section taken midway of the thickness of the gear.

As another method of preventing variation in the pressure angle of the teeth of the cut gear on the outer ends of the curves of said teeth, a hollow mill having its teeth with a pressure angle less than the pressure angle of 14½°, for example, desired as the pressure angle on the teeth of the cut gear may be used. The pressure angle of the teeth of the hollow mills may be 10°. Where this method is employed the center line of the gear blank is lined up with the top of the circular pitch line of the hollow mill just as in Fig. 8. Then the hollow mill is fed into the blank without first raising the gear blank upwardly as in the method heretofore described. After cutting this convex side of a tooth at a 10° pressure angle the gear blank is rotated counterclockwise approximately 9° and locked by the indexing mechanism and the hollow mill 31 is substituted for the hollow mill 29, said hollow mill also having teeth with a pressure angle of approximately 10°, and the concave side of a tooth is cut. Due to the indexing of the gear blank the result will be the cutting of teeth having a 14½° pressure angle at the center of the curve of the teeth with no material variation in such pressure angle at the outer ends of the curves of the teeth.

Another method of cutting the teeth to prevent variation in the pressure angle at the outer ends of the curves of the teeth is to employ a hollow mill having teeth with the same pressure angle desired on the gear teeth or any angle reasonably close thereto, and to support the hollow mill at an angle away from horizontal a sufficient degree to obtain the desired pressure angle on the teeth of the gear being cut. This tipping of the hollow mill during use is illustrated in connection with a rack in Fig. 14 but may also be employed in cutting gears.

After the gears have been cut with any one of the above indexing procedures, one gear having an even number of teeth is supported in mesh with a gear having an uneven number of teeth, with their lower portions depending into a bath of cutting oil. The gears are then driven while in said cutting oil and a grinding compound is fed into the bite of the gears while they are rotating. This procedure grinds out all imperfections, making the teeth of perfect shape and with the right center distance. This method is particularly effective for grinding gears having curved teeth because said curved teeth when in mesh with one another tend to spread the grinding compound laterally along the sides of the teeth to produce efficient grinding.

In cutting the teeth of a cutting wheel such as the wheel 15 of Fig. 1, a hollow mill may be employed which has cutting edges on both the inner and outer sides of its teeth. Thus one mill will cut the concave side of one tooth and the convex side of an adjacent tooth in a single operation, it being noted that in a cutting wheel, such as the wheel 15, the two sides of a tooth are of different contour and one side forms a cutting edge as at 16. This is the reason why a somewhat different procedure is followed than in cutting a gear where the two sides of a tooth conform and where one hollow mill is employed for the convex side and a second hollow mill for the concave side.

In cutting small gears such as the gears 25 and 26 there will be a slight variation in the depth of end portions of the recesses between teeth as compared to the central portion of said recesses but said variation will be so slight that after running the gears with grinding compound there will be a perfect mesh.

In cutting teeth in larger blanks having substantial thickness, it is possible to avoid material variation in the depth of the different portions of a recess between teeth by utilizing a hollow mill having relatively large diameter and by moving the gear up and down with respect to the mill until the position is located where the contacting arc of the hollow mill will cut into the gear blank at as near as possible to a uniform depth throughout the length of the arc being cut.

The principles of the present invention may also be utilized in cutting curved teeth in a rack bar or the like and referring to Fig. 13 it may be seen that the rack bar 37 which is being cut is supported in a substantially vertical position while the hollow mill cutter 31 for cutting the concave sides of the curved teeth 38 in the rack bar is supported at an angle. After the concave sides have been cut by the hollow mill 31 a hollow mill such as the hollow mill 29 may be used for cutting the convex side of the teeth. In lieu of having the hollow mills supported in an angular position as shown in Fig. 13 the hollow mills may be supported in a horizontal position and the blank for the rack may be supported in an angular position.

From the above it is apparent that one broad concept of the invention comprises cutting curved teeth into a blank by making cuts such as those produced by a hollow mill and that an element such as a gear having curved teeth may be produced by milling a single blank of material with only one milling operation necessary for each side of a tooth. It is also apparent that the method is successful because of the novel concept of employing two hollow mill cutters wherein the inside radius of one cutter is equal to the outside radius of the other cutter. It is also apparent that the concept of forming the smaller hollow mill from the larger produces perfect conformity in the two sides of the teeth to be cut.

Various changes and modifications may be made in the toothed element and method of producing the same without departing from the spirit of the invention and all of such changes are contemplated as may come within the scope of the claims.

What I claim is:

1. The method of cutting teeth which are curved in plan view in a metallic blank comprising forming a first hollow mill cutter having cutting edges on the inner sides of its teeth, forming a second hollow mill cutter having cutting edges on the outer sides of its teeth by steps including the feeding of a cylindrical blank in the first hollow mill while the latter is rotating to produce an outer cutting edge contour on the second hollow mill which matches the inner cutting edge contour on the first hollow mill, cutting the convex sides of curved teeth into the metallic blank by rotating said first hollow mill while simultaneously feeding the hollow mill inwardly into the blank to the desired depth of the tooth to be cut, while supporting said hollow mill so that a part only of the circle of teeth thereon contacts the blank, and similarly cutting the concave sides of the teeth by use of the second hollow mill.

2. The method of cutting involute teeth which are curved in plan view in a metallic blank comprising forming a first hollow mill cutter having cutting edges on the inner sides of its teeth which are shaped to cut involute teeth, forming a second hollow mill cutter having cutting edges on the outer sides of its teeth by steps including the feeding of a cylindrical blank into the first hollow mill while the latter is rotating to produce an outer cutting edge contour on the second hollow mill which matches the inner cutting edge contour on the first hollow mill, cutting the convex sides of curved teeth into the metallic blank by rotating said first hollow mill across the gear blank face, and similarly cutting the concave sides of the teeth by use of the second hollow mill.

3. The method of cutting involute teeth which are curved in plan view in a metallic blank comprising forming a first hollow mill cutter having cutting edges on one side of its teeth which are shaped to cut involute teeth in the blank, forming a second hollow mill cutter having cutting edges on the other side of its teeth by steps including the use of the first hollow mill cutter to produce a matching cutting edge contour on the second hollow mill, cutting one side of the curved teeth into the metallic blank by rotating the first hollow mill across the face of the gear blank, and similarly cutting the other side of the teeth on the blank by the use of the second hollow mill.

4. The method of cutting a gear having teeth which are curved in plan view comprising producing one tooth face by rotating a first tool about an axis across the gear face while the gear blank is held in fixed position, moving the blank edgewise a predetermined amount in one direction, rotatably indexing the blank a predetermined amount in the opposite direction, and cutting an adjacent tooth face in the blank while the latter is held in fixed position by moving a different tool across the gear blank face and around the same axis used for the first tool.

5. In a method of producing from a gear blank a gear having teeth which are curved in plan view, the steps of forming a cutting tooth with a cutting edge to conform to one side of a tooth to be cut but with a greater pressure angle, supporting said cutting tooth for rotation about an axis with said axis positioned substantially parallel to a selected center line on the gear blank and spaced therefrom a distance equal to the radius of the circular pitch line of the cutter, moving the gear blank to bring the selected center line thereof a predetermined distance farther away from but still parallel to the axis of rotation of the cutter, cutting said side of the tooth in the blank by rotating said cutter tooth about its axis, forming a second cutting tooth with a cutting edge to cut the opposite side of an adjacent tooth in the blank, supporting said second cutting tooth for rotation about the same axis using the same circular pitch line radius as was used for the first cutting tooth, moving the gear blank to bring the selected center line thereof a predetermined amount nearer to the axis of rotation of the cutter than it was in starting position but still parallel thereto, rotatably indexing the gear blank a predetermined amount in the opposite direction, and cutting a reverse side of an adjacent tooth into the blank by rotation of said second cutter tooth about its axis.

6. In a method of producing from a gear blank a gear having teeth which are curved in plan view, the steps of forming a cutting tooth with a cutting edge to conform to one side of a tooth to be cut but with a greater pressure angle, supporting said cutting tooth for rotation about an axis with said axis positioned substantially parallel to a selected center line on the gear blank and spaced therefrom a distance equal to the radius of the circular pitch line of the cutter, moving the gear blank to bring the selected center line thereof a predetermined distance farther away from but still parallel to the axis of rotation of the cutter, cutting said side of the tooth in the blank by rotating said cutter tooth about its axis while the gear blank is maintained in fixed position, forming a second cutting tooth with a cutting edge to cut the opposite side of an adjacent tooth in the blank, supporting said second cutting tooth for rotation about the same axis using the same circular pitch line radius as was used for the first cutting tooth, moving the gear blank to bring the selected center line thereof a predetermined amount nearer to the axis of rotation of the cutter than it was in starting position but still parallel thereto, rotatably indexing the gear blank a predetermined amount in the opposite direction, and cutting a reverse side of an adjacent tooth into the blank by rotation of said second cutter tooth about its axis while the gear blank is maintained in fixed position.

7. In a method of producing from a gear blank a gear having teeth which are curved in plan view, the steps of forming a cutting tooth with a cutting edge to conform to one side of a tooth to be cut but with a greater pressure angle, supporting said cutting tooth for rotation about an axis with said axis positioned substantially parallel to a selected center line on the gear blank and spaced therefrom a distance equal to the radius of the circular pitch line of the cutter, causing relative movement between the gear blank and cutting tooth to bring the selected center line of the gear blank a predetermined distance farther away from but still parallel to the axis of rotation of the cutter, cutting said side of the tooth in the blank by rotating said cutter tooth about its axis, forming a second cutting tooth with a cutting edge to cut the opposite side of an adjacent tooth in the blank, supporting said second cutting tooth for rotation about the same axis using the same circular pitch line radius as was used for the first cutting tooth, causing relative movement of the gear blank with respect to the cutting tooth to bring the selected center line of the gear blank a predetermined amount nearer to the axis of rotation of the cutter than it was in starting position but still parallel thereto, rotatably indexing the gear blank a predetermined amount in the opposite direction, and cutting a reverse side of an adjacent tooth into the blank by rotation of said second cutter tooth about its axis.

8. In a method of producing from a gear blank a gear having teeth which are curved in plan view, the steps of forming a cutting tooth with a cutting edge to conform to one side of a tooth to be cut but with a greater pressure angle, supporting said cutting tooth for rotation about an axis with said axis positioned substantially parallel to a selected center line on the gear blank and spaced therefrom a distance equal to the radius of the circular pitch line of the cutter, causing relative movement between the gear blank and cutting tooth to bring the selected center line of the gear blank a predetermined distance farther away from but still parallel to the axis of rotation of the cutter, cutting said side of the tooth in the blank by rotating said cutter tooth about its axis while the gear blank is maintained in fixed position, forming a second cutting tooth with a cutting edge to cut the opposite side of an adjacent tooth in the blank, supporting said second cutting tooth for rotation about the same axis using the same circular pitch line radius as was used for the first cutting tooth, causing relative movement between the gear blank and the cutting tooth to bring the selected center line of the gear blank a predetermined amount nearer to the axis of rotation of the cutter than it was in starting position but still parallel thereto, rotatably indexing the gear blank a predetermined amount in the opposite direction, and cutting a reverse side of an adjacent tooth into the blank by rotation of said second cutter tooth about its axis while the gear blank is maintained in fixed position.

9. In a method of cutting involute teeth which are curved in plan view into a cylindrical blank, the steps of forming a first hollow mill cutter having cutting edges on the inner sides of its teeth which are shaped to cut one side of an involute tooth in the blank, cutting said side of the involute tooth into the periphery of the cylindrical blank by rotating the hollow mill while feeding it into the periphery of the blank while the blank is maintained in fixed position and while the hollow mill is so supported that its cutting edges travel in an arc across the periphery of the blank, forming a second hollow mill cutter having cutting edges on the outer sides of its teeth which are shaped to fit the involute cutting edges of the teeth of the first hollow mill when the teeth of the second hollow mill are inserted in the teeth of the first hollow mill, rotatably indexing the blank, and cutting the opposite side of an involute tooth while the blank is held in fixed position by rotating the second hollow mill while feeding it into the periphery of the blank.

EARNEST F. ABER.